UNITED STATES PATENT OFFICE.

PAUL JULIUS AND FRIEDRICH REUBOLD, OF LUDWIGSHAFEN, GERMANY, ASSIGNORS TO THE BADISCHE ANILIN AND SODA FABRIK, OF SAME PLACE.

BLACK SULFUR DYE.

SPECIFICATION forming part of Letters Patent No. 650,327, dated May 22, 1900.

Application filed March 16, 1900. Serial No. 8,951. (No specimens.)

*To all whom it may concern:*

Be it known that we, PAUL JULIUS, doctor of philosophy, a subject of the Emperor of Austria-Hungary, and FRIEDRICH REUBOLD, doctor of philosophy, a subject of the King of Bavaria, both residing at Ludwigshafen-on-the-Rhine, in the Kingdom of Bavaria, Empire of Germany, have invented new and useful Improvements in Black Coloring-Matters, of which the following is a specification.

Our invention relates to the manufacture of a new deep-black coloring-matter which directly dyes unmordanted cotton. It can be obtained from a certain diphenylamin derivative by treating the same with sulfur and sodium sulfid. The said diphenylamin derivative results from the condensation of one molecular proportion of symmetrical dinitro-meta-dichlor-benzene with one molecular proportion of para-amido-phenol in the presence of a substance that will bind the hydrochloric acid formed during the reaction, such as sodium acetate, and heating the condensation product thus formed with ammonia under pressure, whereby dinitro-amido-para-hydroxy-diphenylamin is obtained, which, judging from the method of its formation, has the formula:

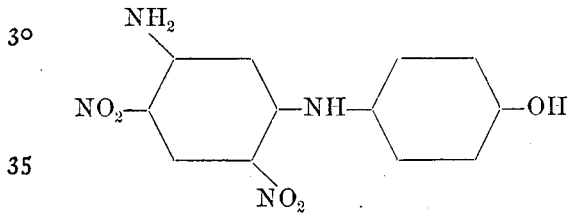

and this when treated with sulfur and sodium sulfid in the manner to be described yields the coloring-matter which we desire to claim.

The following example will serve to illustrate the manner in which our invention may be carried into practical effect and our new coloring-matter obtained. The parts are by weight.

*Production of a new black coloring-matter from dinitro-amido-para-hydroxy-diphenylamin.*—Prepare the required initial material by boiling in a reflux apparatus an alcoholic solution of one molecular proportion of dinitro-dichlor-benzene and one molecular proportion of para-amido-phenol, with sufficient sodium acetate to bind the hydrochloric acid formed during the reaction. Continue the heating until the dinitro-dichlor-benzene has practically disappeared. Isolate the dinitro-chlor-para-oxy-diphenylamin formed in any well-known manner. Heat seventy-five (75) parts thereof with one thousand (1000) parts of alcohol and five hundred (500) parts of an alcoholic solution of ammonia (containing about four and a half per cent. of $NH_3$) for three hours at a temperature of about 150° to 160° centigrade. Filter and precipitate the reaction product from the filtered solution by the addition of water when cold. Mix together thirty (30) parts of the dinitro-amido-para-oxy-diphenylamin obtained as above described, one hundred and eighty (180) parts of crystallized sodium sulfid, and fifty (50) parts of sulfur in an iron vessel provided with a stirring arrangement and heat slowly up to 140° to 150° centigrade. Maintain the melt at this temperature until it has become dry. The powdered melt can be directly used for dyeing.

Our new coloring-matter is easily soluble in water with a green-blue color and dyes unmordanted cotton deep-black shades which are not essentially altered in appearance on treatment with bichromate, copper sulfate, and also with sodium peroxid. The aqueous solution gives on addition of hydrochloric acid a yellow-brown precipitate.

Now what we claim is—

The new coloring-matter which can be obtained from dinitro-amido-para-oxy-diphenylamin, sulfur, and sodium sulfid, which dissolves in water with a green-blue color, dyes unmordanted cotton deep-black shades which are not essentially altered in appearance on treatment with potassium bichromate and copper sulfate, and also not on treatment with sodium peroxid, and which in aqueous solution, on addition of hydrochloric acid, yields a yellow-brown precipitate substantially as described.

In testimony whereof we have hereunto set our hands in the presence of two subscribing witnesses.

PAUL JULIUS.
FRIEDRICH REUBOLD.

Witnesses:
ERNEST F. EHRHARDT,
JOHN L. HEINKE.